United States Patent
Bhaisora et al.

(10) Patent No.: US 8,177,145 B2
(45) Date of Patent: May 15, 2012

(54) FEED INJECTOR SYSTEM

(75) Inventors: Shailesh Singh Bhaisora, Bangalore (IN); Dustin Wayne Davis, Marlborough, CT (US); Ravindra Gopaldas Devi, Bangalore (IN)

(73) Assignee: General Electric Company, Niskayuna, NY (US)

( * ) Notice: Subject to any disclaimer, the term of this patent is extended or adjusted under 35 U.S.C. 154(b) by 257 days.

(21) Appl. No.: 12/264,281

(22) Filed: Nov. 4, 2008

(65) Prior Publication Data
US 2010/0107642 A1    May 6, 2010

(51) Int. Cl.
*B05B 7/06* (2006.01)
(52) U.S. Cl. ............................ 239/424; 239/423
(58) Field of Classification Search ............ 239/416.1, 239/418, 423, 424, 424.4, 425, 433, 434.5, 239/533.2; 431/8–10, 181, 187, 188; 110/104 B, 110/260–265; 60/737
See application file for complete search history.

(56) References Cited

U.S. PATENT DOCUMENTS

| | | | |
|---|---|---|---|
| 3,093,314 A | 6/1963 | Meyer | |
| 3,758,037 A | 9/1973 | Marion et al. | |
| 4,445,444 A | 5/1984 | Espedal | |
| 4,491,456 A | 1/1985 | Schlinger | |
| 4,726,760 A | 2/1988 | Skoog | |
| 6,112,676 A * | 9/2000 | Okazaki et al. | 110/261 |
| 6,520,425 B1 | 2/2003 | Reneker | |
| 2003/0196576 A1 | 10/2003 | Whittaker et al. | |
| 2007/0246575 A1 | 10/2007 | Cairo et al. | |

FOREIGN PATENT DOCUMENTS

| | | |
|---|---|---|
| EP | 0098043 A2 | 1/1984 |
| EP | 0640679 A1 | 3/1995 |
| WO | 0181825 A1 | 11/2001 |

OTHER PUBLICATIONS

Search Report and Written Opinion from corresponding PCT Application No. PCT/US2009/059783 dated Sep. 12, 2011.

* cited by examiner

*Primary Examiner* — Darren W Gorman
(74) *Attorney, Agent, or Firm* — Joseph J. Christian

(57) ABSTRACT

A feed injector system comprises a movable central member, a first member substantially concentric with the central member to define a first channel for conveying a first fluid oxidizer stream, a second member substantially concentric with the first member to define a second channel for conveying a fuel feed, and a third member substantially concentric with the second member to define a third channel for conveying a second fluid oxidizer steam. The first member and the second member are configured to enhance instability in the fuel feed emanating from the second channel.

21 Claims, 4 Drawing Sheets

FEED INJECTOR SYSTEM

BACKGROUND

The subject matter disclosed herein relates generally to integrated gasification combined-cycle (IGCC) power generation systems, and more particularly to an improved feed injector system for injecting feed into a gasifier.

Some gasifiers convert a mixture of fuel and oxygen into an output of partially oxidized gas, sometimes referred to as "syngas." The syngas is typically supplied to a combustor of a gas turbine engine, which gas turbine engine powers a generator that supplies electrical power to a power grid. Exhaust from the gas turbine engines may be supplied to a heat recovery steam generator that generates steam for driving a steam turbine. Power generated by the steam turbine may be used, for example, to drive an electrical generator that provides additional electrical power to the power grid.

Oxygen and fuel are injected into a gasifier through a feed injector in a certain ratio. It is desirable that maximum percentage of carbon in the fuel injected into the gasifier is converted to syngas. The percentage of carbon converted into syngas is generally referred to as "carbon conversion." Carbon conversion is dependent on several factors such as temperature field in the gasifier and residence time of fuel particles in the temperature field.

Feed injectors govern the way oxygen and fuel are injected into the gasifier and, consequently, the way fuel is atomized, thereby controlling residence time of fuel particles in a temperature field of the gasifier. Current feed injectors, such as shown in FIG. 1, may not effectively atomize fuel. Also, feed injectors may not be capable of performing under fifty percent turndown conditions.

Therefore, there is a need for effectively atomizing fuel and maintaining performance under turndown conditions.

BRIEF DESCRIPTION

In accordance with one embodiment disclosed herein, a feed injector system comprises a movable central member, a first member substantially concentric with the central member to define a first channel for conveying a first fluid oxidizer stream, a second member substantially concentric with the first member to define a second channel for conveying a fuel feed, and a third member substantially concentric with the second member to define a third channel for conveying a second fluid oxidizer stream. The first member and the second member are configured to enhance instability in the fuel feed emanating from the second channel.

In accordance with another embodiment disclosed herein, a feed injector system comprises a movable central member comprising a passage to convey a fluid stream, a first member substantially concentric with the central member to define a first channel for conveying a first fluid oxidizer stream, a second member substantially concentric with the first member to define a second channel for conveying a fuel feed, and a third member substantially concentric with the second member to define a third channel for conveying a second fluid oxidizer stream, and flow separators. The first member and the second member are configured to enhance instability in emanating fuel feed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments disclosed herein include a feed injector system. The feed injector system includes a central member having a passage, a first member concentric with the central member, a second member concentric with the first member, and a third member concentric with the second member. The central member and the first member define a first channel. The central member is movable axially with respect to the first member to alter the area of a discharge end of the first channel. The first member and the second member define a second channel. The second member and the third member define a third channel.

Figure 1:
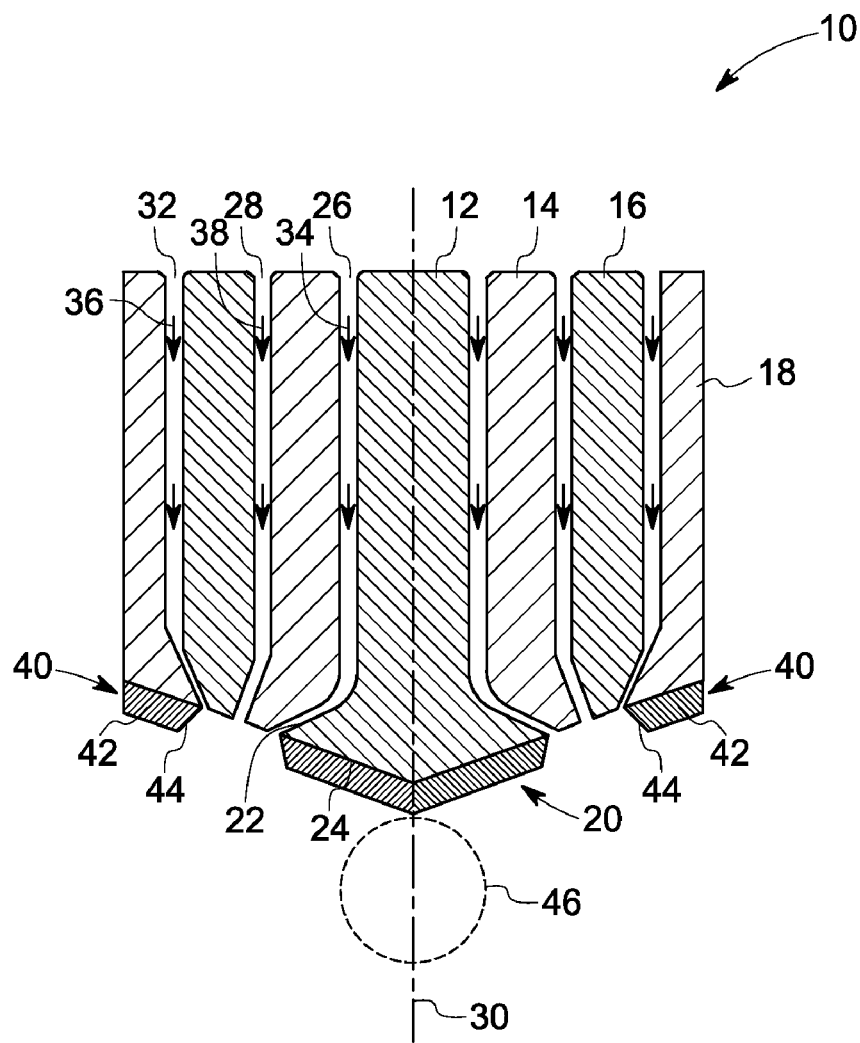
FIG. 1 illustrates a sectional view of an existing advanced feed injector.

FIG. 1 illustrates a sectional view of an existing advanced feed injector 10. The feed injector includes a central member 12, a first member 14, a second member 16, and a third member 18. A discharge end 20 of the central member 12 includes a contoured profile 22 adjoining a conical profile 24. The first member 14 is concentric with the central member 12, up to the contoured profile, to define a first channel 26. The second member 16 is concentric with the first member 14 to define a second channel 28. The end portions of first channel 26 and second channel 28 diverge away from an axis 30 of the injector 10. The third member 18 is concentric with the second member 16 to define a third channel 32. The end portion of the third channel 32 converges towards the axis 30 of the injector 10.

A first fluid oxidizer stream 34 is typically conveyed through the first channel 26. A second fluid oxidizer stream 36 is typically conveyed through the third channel 32. Typically, air or oxygen is used for first and second fluid oxidizer streams. A fuel feed 38 is conveyed through the second channel 28. Fuel feed 38 can include, for example, a coal slurry. Atomization of the fuel takes place as the fuel emanating from the second channel 28 interacts with first and second oxidizer streams. Instability in the emanating fuel is vital for effective atomization of the fuel.

The discharge end 40 of the third member 18 includes a cooling arrangement such as cooling coils 42 for the injector 10. The cooling coils 42 form a chamfer 44. The chamfer 44 diffuses the second oxidizer stream 36. As a result, there is a significant loss in kinetic energy of the second oxidizer stream 36. The second fluid oxidizer stream 36 cannot be effectively utilized due to loss in kinetic energy. Atomization of fuel is also dependent on the exchange of momentum and interaction between the fluid oxidizer streams and the fuel feed. Therefore, kinetic energy of oxidizer streams and instability in emanating fuel feed play a vital role in effectively atomizing fuel.

Fuel and oxidizer streams emanate from the injector 10 as continuous concentric sheets. As a result, an area below the central member 12 is not exposed to ambience in the gasifier and a low-pressure zone is formed below the central member 12. The low pressure creates recirculation of the fuel feed and the oxidizer streams below the central member 12 of the injector. A recirculation zone 46 is symbolically shown as a dotted circle in FIG. 1.

Figure 2:
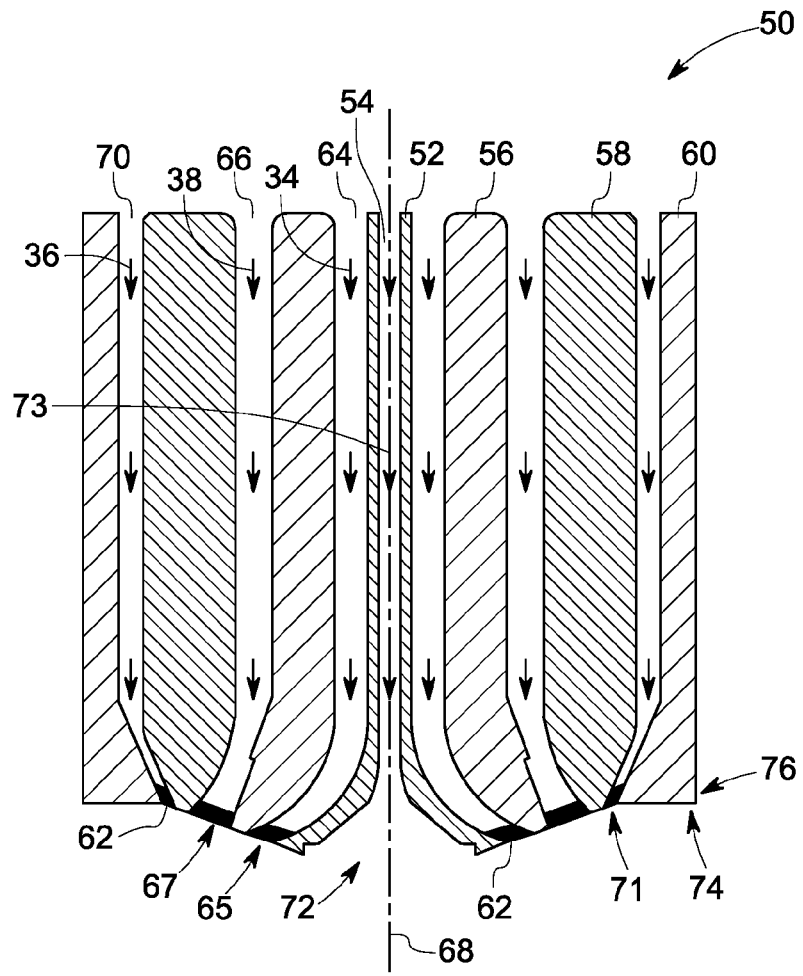
FIG. 2 illustrates an embodiment of an advanced feed injector system in accordance with aspects disclosed herein.

FIG. 2 illustrates a sectional view of an embodiment of an advanced feed injector system 50. The feed injector system includes a central member 52 having a passage 54, a first member 56, a second member 58, a third member 60, and flow separators 62. The first member 56 is concentric with the central member 52 to define a first channel 64 for conveying a first fluid oxidizer stream 34 into a gasifier (not shown). The second member 58 is concentric with the first member 54 to define a second channel 66 for conveying a fuel feed 38 into the gasifier. The discharge end 65 of the first channel 64 and the discharge end 67 of the second channel 66 diverge away from an axis 68 of the feed injector system 50. The third member 60 is concentric with the second member 58 to define a third channel 70 for conveying a second fluid oxidizer stream 36 into the gasifier. The discharge end 71 of the third channel 70 converges towards the axis 68 of the feed injector system 50.

The passage 54 is at the center of the central member 52, along an axis 68 of the feed injector system 50. In one embodiment, the discharge end 72 of the central member 52 comprises an inverted funnel-like profile. The passage 54 is used to convey a fluid stream 73.

The feed injector system 50 mainly includes four advanced aspects over the existing feed injectors. A first aspect is regarding effective utilization of the second fluid oxidizer stream. A second aspect concentrates on eliminating recirculation of fuel and oxidizer streams. A third aspect is related to enhancing instability to the emanating fuel feed. A fourth aspect is the ability to maintain performance of injector system under turndown conditions.

In order to effectively utilize the second fluid oxidizer stream, the discharge end 74 of the third member 60 is provided with a substantially-square shoulder 76 such that the injector 50 can be used with cooling systems that do not require cooling coils. As discussed previously, chamfers formed by cooling coils diffuse and cause the second oxidizer stream to lose kinetic energy. The feed injector system 50 does not require cooling coils, thereby eliminating loss in kinetic energy of the second fluid oxidizer stream 36 due to chamfers. Therefore, the second fluid oxidizer stream 36 is conveyed with enhanced efficiency.

Without the flow separators 62 the oxidizer streams and the fuel feed emanate from the injector as continuous concentric sheets. With the flow separators 62, the fluid oxidizer streams and the fuel feed emanate as discrete sheets. Therefore, high pressure around the feed injector system 50 in the gasifier is exposed to an area below the central member 52. As discussed previously, a low-pressure zone below the central member 52 creates recirculation of the fuel feed and oxidizer streams below the central member 52. Exposing a low-pressure zone to high pressure in a gasifier avoids recirculation of fuel feed and oxidizer streams below the central member.

Figure 3:
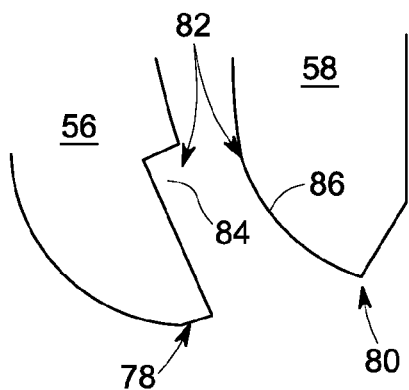
FIG. 3 illustrates an embodiment of discharge ends of first and second members in accordance with aspects disclosed herein.
Figure 4:
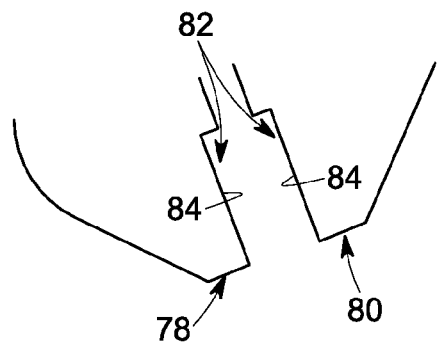
FIG. 4 illustrates another embodiment of discharge ends of first and second members in accordance with aspects disclosed herein.

Referring to FIGS. 3 and 4, the discharge end 78 of the first member 56 and the discharge end 80 of the second member 58 are provided with instability-enhancing features 82. The instability-enhancing features 82 enhance instability in the emanating fuel feed for effective atomization of the fuel. The instability-enhancing features 82 are in the path of the fuel feed that is conveyed through the second channel 66. In the embodiment of FIG. 3, the instability-enhancing features 82 include an indentation 84 on the first member 56 and a smooth blend 86 on the second member 58. The indentation 84 is a depressed surface on the discharge end of the first member 56. The discharge ends of first and second members of existing feed injectors, such as shown in FIG. 1, do not have such depressed surfaces and smooth blend to enhance instability in emanating fuel feed. In another embodiment shown in FIG. 4, the instability-enhancing features 82 include indentations 84 on both the first member 56 and the second member 58. In another embodiment (not shown), the instability-enhancing features 82 include a smooth blend on both the first member 56 and the second member 58.

Figure 5:
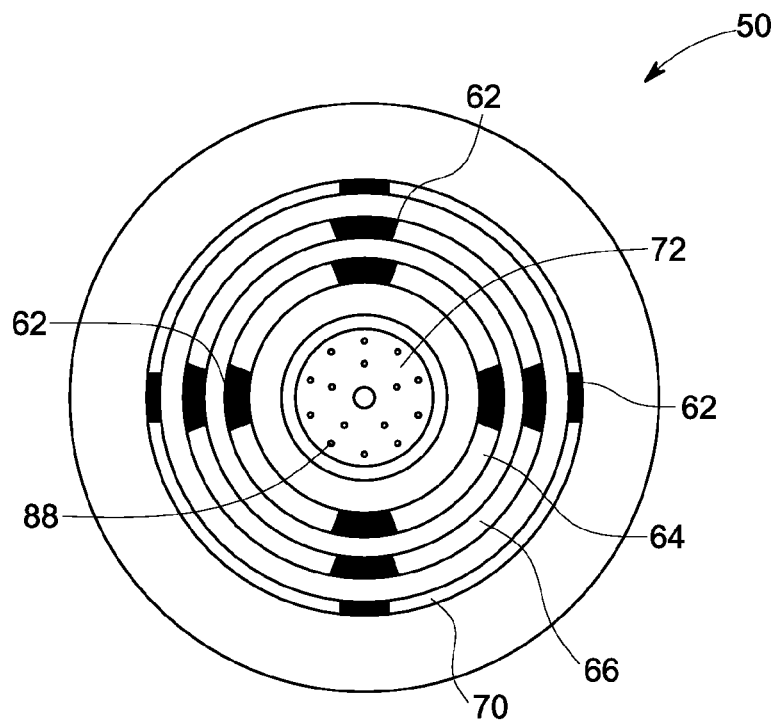
FIG. 5 illustrates bottom view of the advanced feed injector system of FIG. 3 in accordance with aspects disclosed herein.
Figure 6:
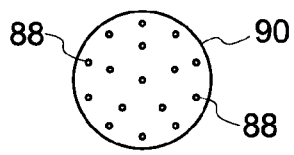
FIG. 6 illustrates a perforated plate in accordance with aspects disclosed herein.

FIG. 5 shows a bottom view of the feed injector system. The feed injector system 50 is provided with flow separators 62 and the discharge end 72 of the central member 52 is provided with perforations 88 through which a fluid stream is conveyed. The flow separators 62 are placed in first 64, second 66, and third 70 channels to split the flow of the fuel feed, first fluid oxidizer stream, and second fluid oxidizer stream. In the embodiment shown in FIG. 5, flow separators 62 are equally spaced apart in the channels and are in line with each other. However, the flow separators 62 can be placed in the channels in various arrangements to separate the flow of the fuel feed and oxidizer streams inside the channels such that the fuel feed and oxidizer streams emanate as discrete sheets. In one embodiment, the perforations 88 can be provided using a perforated plate 90, shown in FIG. 6, at the discharge end 72 of the central member 52.

Recirculation below the central member 52 is also avoided by conveying a fluid stream through the passage in the central member. In one embodiment, carbon dioxide is used as the fluid stream that is conveyed through the passage. The perforations 88 diffuse the fluid stream in a wider area, thereby avoiding recirculation of fuel feed and oxidizer streams below the central member 52.

Figure 7:
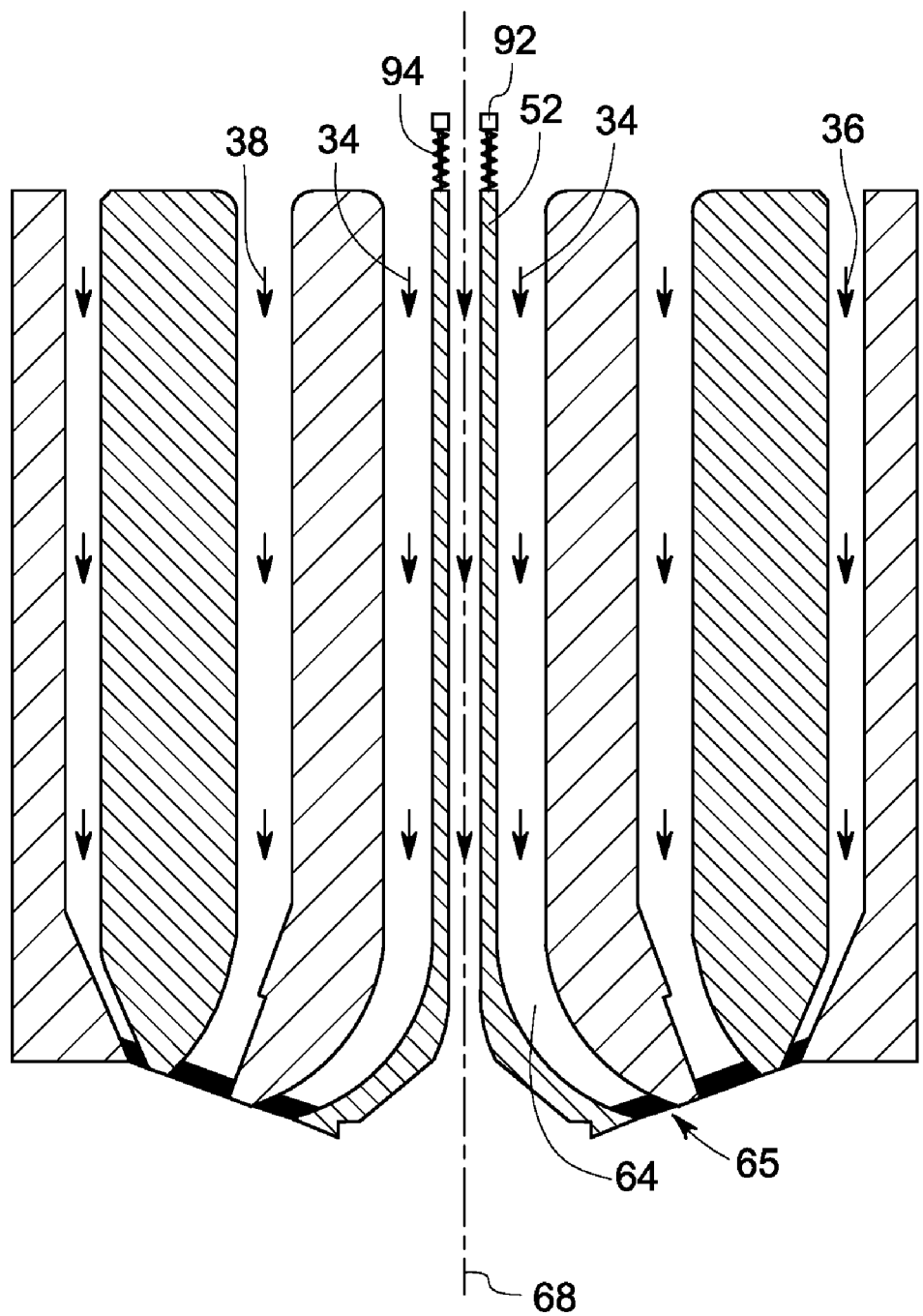
FIG. 7 illustrates an embodiment of an advanced feed injector system with a spring and screw system in accordance with aspects disclosed herein.

Referring to FIG. 7, the central member 52 is movable axially with respect to the first member to alter the area of a discharge end 65 of the first channel 64. In one embodiment, a screw 92 and spring 94 system can be associated with the central member to move the central member. The tension in the spring 94 maintains the position of the central member. The screw 92 can be turned to move the central member 52 along the axis 68 to alter the area of a discharge end 65 of the first channel. By altering the area of the discharge end 65 of the first channel, the flow of the first oxidizer stream 34 can be controlled.

In order to maintain performance of injector system 50 under turndown conditions, the central member 52 is moved to reduce the area of discharge end 65 of the first channel and therefore reducing the flow of first oxidizer stream 34 that is conveyed through the first channel 64. Typically, the first 34 and second fluid 36 oxidizer streams are conveyed with the same flow rate. In addition to reducing the area of discharge end 65 of the first channel 64, the flow rates of the first and second fluid oxidizer streams can be altered to maintain performance. As an example, under fifty percent turndown conditions, the area of discharge end 65 of the first channel is reduced to half and the flow rate of first fluid oxidizer stream 34 is reduced by seventy percent and the flow rate of second fluid oxidizer stream 36 is reduced by thirty percent.

The feed injector system 50 is suitable for various fuel feeds such as, but not limited to, coal slurry, dry feed, oils, liquid hydrocarbons, or combinations thereof. Air or oxygen can be used for first and second fluid oxidizer streams. Carbon dioxide can be used as the fluid stream that is conveyed through the passage in the central member.

The various embodiments of a feed injector system 50 described above thus provide a way to effectively atomize fuel and maintain performance under turndown conditions. The feed injector system enhances instability of fuel feed, maintains kinetic energy of a fluid oxidizer stream and avoids recirculation. The feed injector system 50 has a movable central member to maintain performance under turndown conditions.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A feed injector system, comprising:
   a central member;
   a first member substantially concentric with the central member to define a first channel for conveying a first fluid oxidizer stream;
   a second member substantially concentric with the first member to define a second channel for conveying a fuel feed;
   the first member and the second member are configured to enhance instability in the fuel feed emanating from the second channel;
   a third member substantially concentric with the second member to define a third channel for conveying a second fluid oxidizer stream; and
   a plurality of flow separators spaced apart and disposed in each channel among the first, second and the third channels, wherein each said flow separator allows discrete stream discharge at respective discharge ends of the channels.

2. The system of claim 1, wherein the central member comprises a passage to convey a fluid stream.

3. The system of claim 2, wherein a discharge end of the central member comprises perforations through which the fluid stream is conveyed.

4. The system of claim 2, wherein the central member is adapted to control flow of the first oxidizer stream.

5. The system of claim 4, wherein the central member is movable axially with respect to the first member to alter the area of a discharge end of the first channel.

6. The system of claim 1, wherein discharge ends of the first member and the second member comprise instability-enhancing features to enhance instability in the emanating fuel feed.

7. The system of claim 1, wherein a discharge end of the third member comprises a substantially-square shoulder.

8. The system of claim 1, wherein the flow separators are positioned at the discharge ends of the first, second and the third channels.

9. They system of claim 2, wherein the fluid stream comprises carbon dioxide.

10. The system of claim 1, wherein the fuel feed comprises slurry, dry feed, oils, liquid hydrocarbons, or combinations thereof.

11. The system of claim 1, wherein the fuel feed comprises coal slurry.

12. A feed injector system, comprising:
    a central member comprising a passage to convey a fluid stream;
    a first member substantially concentric with the central member to define a first channel for conveying a first fluid oxidizer stream;
    a second member substantially concentric with the first member to define a second channel for conveying a fuel feed;
    the first member and the second member are configured to enhance instability in emanating fuel feed;
    a third member substantially concentric with the second member to define a third channel for conveying a second fluid oxidizer stream; and
    a plurality of flow separators spaced apart and disposed in each channel among the first, second and the third channels, wherein each said flow separator allows discrete stream discharge at respective discharge ends of the channels.

13. The system of claim 12, wherein a discharge end of the central member comprises perforations through which the fluid stream is conveyed.

14. The system of claim 12, wherein the central member is adapted to control flow of the first oxidizer stream.

15. The system of claim 14, wherein the central member is movable axially with respect to the first member to alter the area of a discharge end of the first channel.

16. The system of claim 12, wherein discharge ends of the first member and the second member comprise instability-enhancing features to enhance instability in the emanating fuel feed.

17. The system of claim 12, wherein a discharge end of the third member comprises a substantially-square shoulder.

18. The system of claim 12, wherein the fluid stream comprises carbon dioxide.

19. The system of claim 12, wherein the fuel feed comprises slurry, dry feed, oils, liquid hydrocarbons, or combinations thereof.

20. The system of claim 12, wherein the fuel feed comprises coal slurry.

21. The system of claim 12, wherein the flow separators are positioned at discharge ends of the first, second and the third channels.

* * * * *

UNITED STATES PATENT AND TRADEMARK OFFICE
CERTIFICATE OF CORRECTION

PATENT NO.        : 8,177,145 B2
APPLICATION NO.   : 12/264281
DATED             : May 15, 2012
INVENTOR(S)       : Bhaisora et al.

It is certified that error appears in the above-identified patent and that said Letters Patent is hereby corrected as shown below:

On the cover page, item (57), under "ABSTRACT", in Column 2, line 8, delete "steam." and insert -- stream. --, therefor.

In Column 3, Line 19, delete "first member 54" and insert -- first member 56 --, therefor.

In Column 6, Line 6, in Claim 9, delete "They" and insert -- The --, therefor.

Signed and Sealed this
Tenth Day of July, 2012

David J. Kappos
*Director of the United States Patent and Trademark Office*